US010277385B1

(12) United States Patent
Anandan et al.

(10) Patent No.: US 10,277,385 B1
(45) Date of Patent: Apr. 30, 2019

(54) SLAVE NODE FOR CAN BUS NETWORK

(71) Applicant: NXP B.V., Eindhoven (NL)

(72) Inventors: Swaminatha Vijayaraj Anandan, Bangalore (IN); Matthias Berthold Muth, Stelle (DE)

(73) Assignee: NXP B.V., San Jose, CA (US)

( * ) Notice: Subject to any disclaimer, the term of this patent is extended or adjusted under 35 U.S.C. 154(b) by 0 days.

(21) Appl. No.: 15/990,676

(22) Filed: May 27, 2018

(51) Int. Cl.
*H04L 7/02* (2006.01)
*H04L 12/40* (2006.01)
*H04L 29/08* (2006.01)

(52) U.S. Cl.
CPC .......... *H04L 7/02* (2013.01); *H04L 12/40* (2013.01); *H04L 67/12* (2013.01); *H04L 2012/40215* (2013.01); *H04L 2012/40273* (2013.01)

(58) Field of Classification Search
USPC .................................................. 710/110, 26
See application file for complete search history.

(56) References Cited

U.S. PATENT DOCUMENTS

| | | | |
|---|---|---|---|
| 6,073,249 A * | 6/2000 | Watabe | G06F 11/1658 714/4.1 |
| 6,728,892 B1 | 4/2004 | Silvkoff et al. | |
| 6,959,014 B2 | 10/2005 | Pohlmeyer et al. | |
| 7,701,943 B2 | 4/2010 | Harris et al. | |
| 2003/0195645 A1 | 10/2003 | Pillay et al. | |
| 2005/0102430 A1 | 5/2005 | Huber et al. | |
| 2006/0112191 A1 * | 5/2006 | Ooi | H04J 3/0658 709/248 |
| 2006/0120390 A1 | 6/2006 | Habben et al. | |
| 2010/0158045 A1 | 6/2010 | Shin et al. | |
| 2011/0138086 A1 * | 6/2011 | Kwon | G06F 13/28 710/26 |
| 2014/0025854 A1 * | 1/2014 | Breuninger | G05B 19/0423 710/110 |
| 2016/0224443 A1 * | 8/2016 | Kuba | G06F 13/385 |
| 2018/0196941 A1 * | 7/2018 | Ruvio | H04L 63/1425 |

OTHER PUBLICATIONS

Stuart Robb, "CAN Bit Timing Requirements", AN1798 Freescale Semiconductor, Inc., 1999.
Yves Briant, Using and Synchronizing the S08's Internal Clock for LIN Slave Implementations, AN3757 Freescale Semiconductor, Inc., Oct. 2008.

* cited by examiner

*Primary Examiner* — Eva Y Puente
(74) *Attorney, Agent, or Firm* — Charles E. Bergere

(57) ABSTRACT

A CAN bus system that permits a slave node to be connected to the CAN bus. The slave node uses a preamble of a data frame transmitted by the master node on the bus to generate an internal CAN sampling clock. The slave node oversamples frames transmitted over the bus, and monitors the sampled data for a predetermined pattern, which is used to generate the slave node CAN sampling clock. Thus, the slave node does not require or include an external crystal for generating its CAN sampling clock.

19 Claims, 4 Drawing Sheets

- PRIOR ART -

SLAVE NODE FOR CAN BUS NETWORK

BACKGROUND

The present invention relates generally to electronic devices (nodes) that communicate over a Controller Area Network (CAN) bus, and, more particularly, to a slave node for a CAN bus network.

Today's automobiles include many electronic control units (ECUs) that gather and share data, such as ECUs for sensors (e.g., airbag sensors, anti-lock braking sensors, etc.), actuators (e.g., window and door locks), and entertainment and navigation systems. These ECUs typically communicate with each other using the CAN (Controller Area Network) bus. The CAN bus is a serial bus developed in the mid-1980s for in-vehicle networks in cars. The CAN bus is a multi-master bus system that assumes all nodes have a precise local oscillator source, which ensures that all the nodes are operating at the same effective baud rate, and can communicate without the need of a learning phase regarding the common bus speed. CAN busses also can be found in other embedded control applications, such as medical and test equipment and factory automation.

FIG. 1 shows a conventional CAN bus system 10 includes a plurality of nodes 12 connected together over a CAN bus 14. Each of the nodes 12 is a master, and includes an external crystal oscillator 16 as a clock source for generating an accurate, local clock signal. A highly accurate CAN clock signal is required to ensure that the communication speed and frequencies are similar across all nodes and all operating corners. Thus, clock reliability is an important constraint in any CAN/CAN FD bus system to achieve lossless communication across all functional operating corners.

However, requiring each node to have an external oscillator makes the nodes expensive. Accordingly, it would be advantageous to have a way to interconnect nodes on a CAN bus without requiring each node to have an external oscillator.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Figure 1:
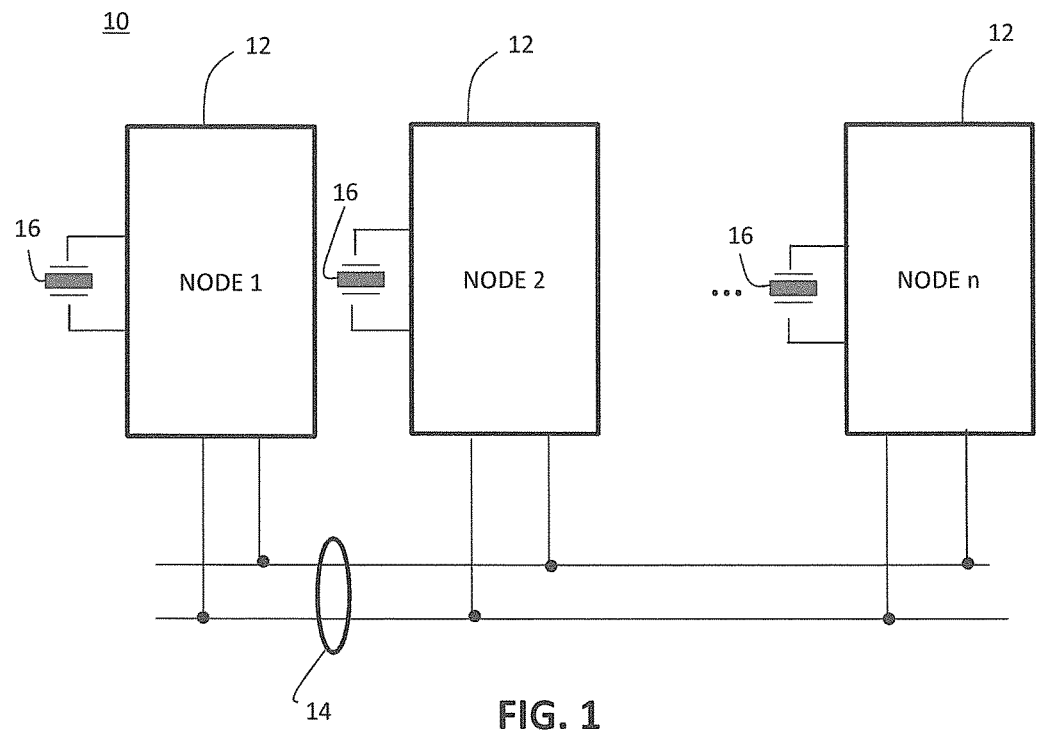
FIG. 1 is a schematic block diagram of a conventional CAN bus system.

Detailed illustrative embodiments of the invention are disclosed herein. However, specific structural and functional details disclosed herein are merely representative for purposes of describing example embodiments of the invention. The invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As user herein, the term "bus" is used to refer to a plurality of signals or conductors that may be used to transfer one or more various types of information, such as data, addresses, control or status. The terms "assert" and "negate" are used when referring to the rendering of a signal status bit, or similar apparatus into its logically true or logically false state, respectively. If the logically true state is a logic level one (also referred to as logic high), the logically false state is a logic level zero (also referred to as logic low). And if the logically true state is a logic level zero, then the logically false state is a logic level one.

The description refers to the CAN bus, but it will be understood by those of skill in the art that the invention also applies to the CAN/FD (Flexible Data rate) bus as well. Thus, reference herein to the CAN bus means both the CAN and CAN/FD busses.

In one embodiment, the present invention provides a CAN bus system including a master node, at least one slave node, and a CAN bus that couples the master node and the slave node and enables communications therebetween. The master node includes a master controller unit and an external crystal oscillator. The external crystal oscillator generates a clock signal used by the master controller unit to generate an internal, master node CAN clock signal. The slave node includes a slave controller unit.

The slave node does not include and is not coupled to an external crystal oscillator, nor does it receive any signals from an external oscillator, but instead, the slave controller unit generates its own slave node CAN clock signal. The slave node monitors the CAN bus, analyzes data frames transmitted over the CAN bus for a predetermined fixed pattern, and uses the predetermined fix pattern to generate the slave node CAN clock signal.

In another embodiment, the present invention provides a slave node for a CAN bus system. The slave node includes a slave controller unit that processes data frames generated by a master node connected to a CAN bus, and generates its own data frames for transmission over the CAN bus. The slave controller unit generates, internally, a CAN clock signal and operates in accordance with the CAN clock signal. The slave node also includes a CAN transceiver for connection to the CAN bus, and connected to the slave controller unit. The CAN transceiver receives the data frames transmitted over the CAN bus by the master node and provides these data frames to the slave controller unit. The CAN transceiver also provides the data frames generated by the slave controller unit to the CAN bus for transmission there-across. The generated CAN clock signal permits the slave node to operate at a same effective baud rate as the master node. Further, the slave node is not connected to an external crystal oscillator for generation of the CAN clock signal.

In yet another embodiment, the present invention provides a method of operating a slave node connected to a CAN bus having one or more master nodes and one or more slave nodes connected to the CAN bus, where each master node has an external crystal oscillator for generating its CAN clock signal, and none of the slave nodes includes an external oscillator for generating their respective CAN clock signals. The method includes receiving CAN data transmitted over the CAN bus, sampling the received data, using an oscillator clock signal generated with an internal oscillator, for a predetermined fixed pattern, and upon detection of the predetermined fixed pattern, counting edges of the bits of the data defining the predetermined fixed pattern using the oscillator clock signal to determine a divisor D. The method also includes generating a local CAN clock signal using the divisor D, the oscillator clock signal, and a constant L, and then using the local CAN clock signal to process data frames, where the local CAN clock signal permits the slave node to operate at a same effective baud rate as the one or more master nodes.

Figure 2:
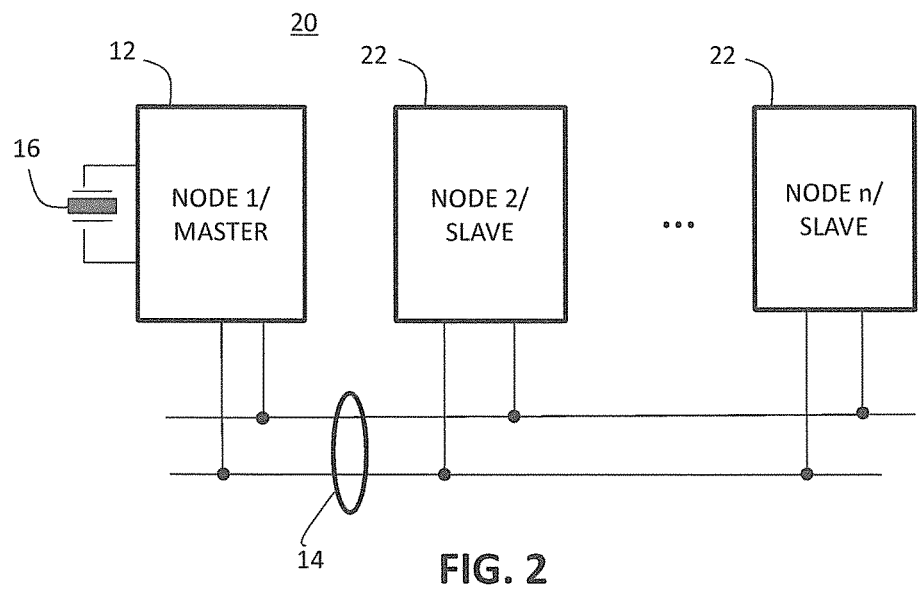
FIG. 2 is a schematic block diagram of a CAN bus system in accordance with an embodiment of the present invention.

Referring now to FIG. 2, a schematic block diagram of a CAN bus system 20 in accordance with an embodiment of the present invention is shown. The CAN bus system 20 is a single-master, multiple slave configuration. More particularly, the CAN bus system 20 includes a first node 12 connected to a CAN bus 14, where the first node 12 acts as a master and includes an external clock source 16—that is, an external crystal oscillator. Thus, the first node 12 is a conventional CAN bus node. The system 20 also has one or more slave nodes 22 that are connected to the CAN bus 14. The slave nodes 22 do not include an external crystal, but instead, the slave nodes 22 monitor the bus 14 and analyze the frames transmitted over the bus 14 for a predetermined fixed pattern, as will be discussed in more detail below, and then use the predetermined fixed pattern to generate an internal clock signal. Thus, the disadvantage of requiring each node to have an external crystal is overcome.

Figure 3:
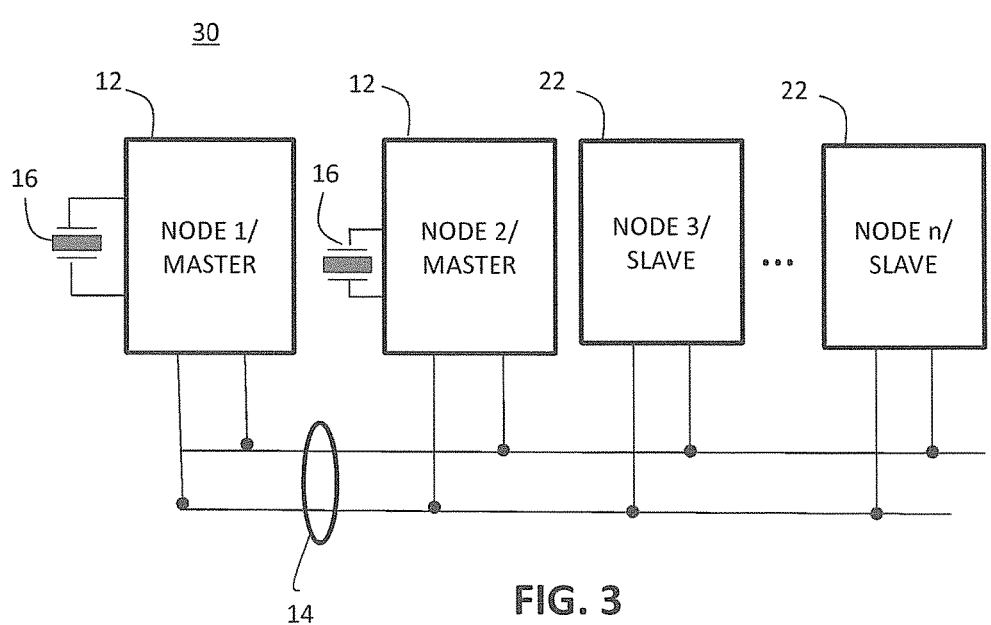
FIG. 3 is a schematic block diagram of a CAN bus system in accordance with another embodiment of the present invention.

FIG. 3 is a schematic block diagram of a CAN bus system 30 in accordance with another embodiment of the present invention. In this embodiment, the CAN bus system 30 is a multiple-master, multiple-slave configuration. More particularly, the CAN bus system 30 includes multiple master nodes 12 connected to a CAN bus 14, and one or more slave nodes 22 also connected to the CAN bus 14. The master nodes 12 each include an external clock source 16, while the slave nodes 22 do not have an external crystal oscillator. Instead, the slave nodes 22 monitor the bus 14 and analyze the frames transmitted over the bus for a predetermined fixed pattern, and then use the predetermined fixed pattern to generate an internal clock. Thus, a CAN bus system in accordance with the present invention may include one or more master nodes 12 and one or more slave nodes 22, where the master nodes 12 include an external crystal 16 and the slave nodes 22 do not include an external crystal, but instead, generate an internal clock signal based on a predetermined pattern transmitted over the bus 14.

Figure 4:
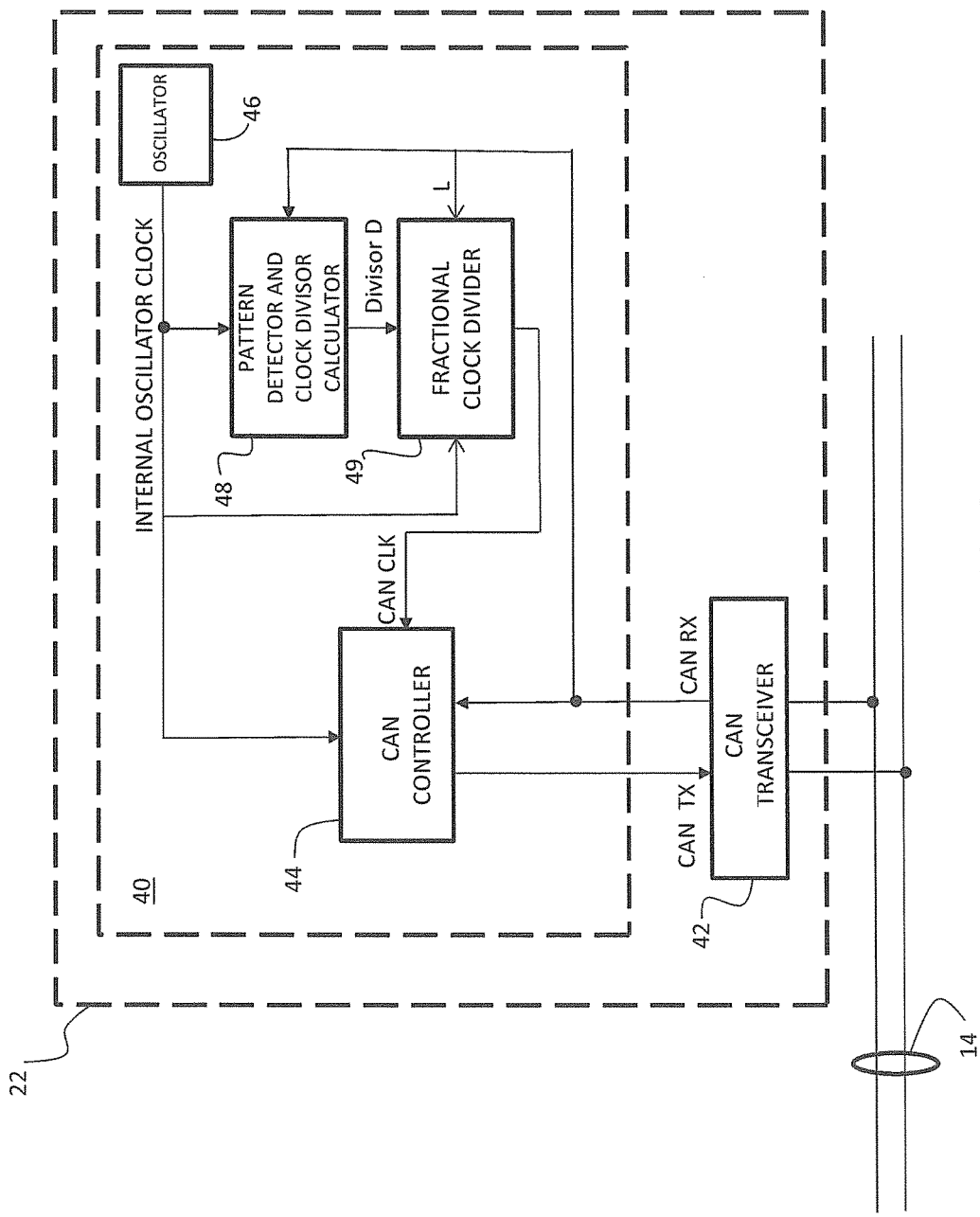
FIG. 4 is a schematic block diagram of a slave node for a CAN bus system in accordance with the present invention.

FIG. 4 is a high-level schematic block diagram of a slave node 22, in accordance with an embodiment of the present invention, connected to a CAN bus 14. The slave node 22 includes a processor or microcontroller unit 40 (hereinafter MCU 40) connected to the CAN bus 14 by way of a CAN transceiver 42.

The MCU 40 may comprise a microcontroller such as a P87C591VFA single-chip 8-bit microcontroller, which is available from NXP B.V. of the Netherlands. Alternatively, the MCU 40 may comprise a finite state machine (FSM) implemented using a microcontroller, such as the microcontroller from NXP or a custom integrated circuit (i.e., an ASIC). Although the 87C591VFA microcontroller includes an on-chip oscillator, if used in the conventional manner, an external crystal is needed to correct the internal oscillator accuracy for CAN communications. However, as will be understood, in accordance with the present invention, an external crystal is not required to correct the internal oscillator to obtain an accurate CAN clock.

The CAN transceiver 42 may comprise a conventional CAN transceiver, such as the TJA1040, also available from NXP B.V., which is a high-speed CAN transceiver for use in automotive and general industrial applications that supports the differential bus signal representation described in the international standard for in-vehicle high speed CAN applications (ISO11898). The CAN transceiver 42 receives data on the bus 14 and converts the data from CAN bus levels to levels used by the MCU 40. The CAN transceiver 42 also converts data generated by the CAN controller 44 to levels suitable for transmission on the CAN bus 14.

The MCU 40 includes a CAN controller 44, an on-chip oscillator 46, a pattern detector 48, and a fractional clock divider 49. The MCU 40 also may include other logic for performing a variety of other functions, as well as a plurality of memory blocks, depending on the needs of the system as would be understood by those of skill in the art. Also, while the pattern detector 48 and fractional clock divider 49 are shown as separate blocks, it will be understood by those of skill in the art that these blocks represent functions that can be performed by the MCU 40 and are not necessarily separate or unique logic circuits within the MCU 40.

The CAN controller 44 receives digital data from the CAN transceiver 42 in a conventional manner, and provides data to be transmitted on the CAN bus 14 to the transceiver 42, also in a conventional manner. However, since the MCU 40 is for a slave node 22, the MCU 40 analyzes the data for a predetermined pattern, which is used to convert an asynchronous communication to a synchronous communication by moving the sampling point as per the baud rate of the master node 12. Thus, for a slave device 22, the CAN clock provided to the CAN controller 44 is generated internally, using the on-chip oscillator 46, the pattern detector 48, and the clock divider 49, as opposed to a CAN master 12, which obtains its CAN clock from an external crystal. As noted above with reference to FIGS. 2 and 3, there may be multiple masters 12 connected to the bus 14 and the slave(s) 22 monitor the bus 14 for the predetermined pattern.

Figure 5:
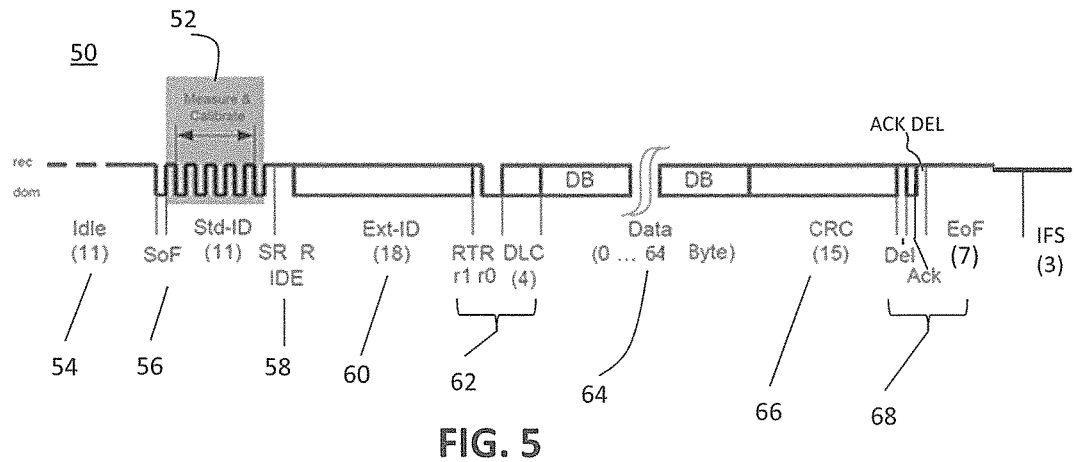
FIG. 5 is a timing diagram for a CAN frame including a fixed preamble in accordance with an embodiment of the present invention.

FIG. 5 shows a frame of CAN data 50 (extended frame format), where the header of each frame provides a fixed pattern, which can be measured by the slave nodes 22 using the on-chip oscillator 46. To fulfil CAN clock accuracy requirements, the CAN frame 50 is sampled for a fixed preamble 52 and the CAN clock is internally generated. To ensure that the CAN clock is calibrated continuously for every valid CAN frame 50, and to allow the payload to act as data, in the presently preferred embodiment, the preamble 52 is made part of the identifier (ID). However, the fixed preamble 52 also could be part of the payload field instead of the ID field. Thus, according to the present invention, only one (master) node 12 is needed to define the bus speed of all the other nodes in the system. That is, one single node in the system can act as a clock master, starting the communication to other nodes by using a known preamble.

The CAN data frame 50 of FIG. 5 shows idle state 54 of 11 bits, which is the minimum number of bits for idle as per the CAN protocol. The idle state 54 could be more than 11 bits, which also is permitted by the CAN protocol considering the ACK delimit 1 bit, EoF 7 bits, and Inter Frame Distance IFS 3 bits, which is described below, and then a 1-bit Start of Frame (SoF) field 56, followed by an identifier (29 bits), which comprises an 11-bit standard identifier (STD-ID), some control bits (SRR and IDE) 58, and an 18-bit extended ID (Extended Identifier) 60.

In one embodiment of the present invention, the standard identifier field comprises the predetermined pattern 52, which in this embodiment is 11-bits. In one embodiment, the predetermined pattern comprises 10101010101 in the ID1 field, and this pattern then is fixed and functions as a reference for the slave node 22 so that the slave node 22 can update its CAN clock. The extended identifier 60 is followed by some control bits 62, namely RTR, r0, r1, and 4-bits DLC. After DLC are data fields 64, which may comprise up to 64 bytes of data for CAN FD. The data field 64 is followed by a 15-bit CRC 66, some additional control bits 68, delimiter (1 bit), Ack (1 bits), Ack Delimiter (1 bit), EoF (End of Frame, 7 bits) and then IFS (Inter Frame Distance, 3 bits). Those of skill in the art familiar with the CAN bus protocol will understand these fields 54-68 of the data frame 50 and realize the significance of the predetermined bit pattern 52.

Referring now to FIGS. 4 and 5, the CAN controller 44 receives frame data transmitted over the bus 14, such as the frame of data 50. The data frame 50 is sampled by the CAN controller 44. The pattern detector 48 also receives the bus data 50 and scans the data for the predetermined pattern 52. The pattern detector 48 may comprise edge detectors and counters. When the pattern detector 48 detects the predetermined pattern 52, it detects the edges and starts counting with the internal oscillator 46, and then provides the count value as a divisor D to the clock divider 49. The divisor D is calibrated every frame and updated for any deviation of node internal oscillator frequency, CAN physical layer characteristics, and master clock frequency for all corner operating conditions. The preamble measurement is based on the oscillator 46 (on-chip clock source), which is used to measure the length of the preamble (length is defined by the number of edges of the oscillator 46). As such, the number of internal clock cycles within the preamble time is used as a result. The granularity of counted internal oscillator cycles depends on the internal clock frequency relative to the length of the preamble, so the longer the preamble, the higher the accuracy of measurement. As mentioned above, in one embodiment, the preamble comprises six bits of the ID field, which was deemed suitable for accuracy without using too much identifier space. The preamble could be made longer for even greater accuracy, at the expense of using more Identifier bits. With the proposed preamble, the length of the preamble is defined by the six (6) falling edges of the preamble and within that time the internal clock source is accumulated to get a number for that time. Thus, as will be understood by those of skill in the art, the number of edges (or bits) counted could be more or fewer as the number of edges counted has no impact on the principle itself, but the more edges that are counted, the more accurate a result may be achieved. Further, choosing a different preamble may lead to different counts.

The clock divider 49 receives the divisor D and divides a constant L by the divisor D and multiplies L/D times the internal oscillator clock signal to generate the slave CAN clock signal, which is provided to the CAN controller 44.

The value of the constant L is based on the baud rate used to generate a fixed 10 MHz CAN clock. For 1000 Kbps, L=80; for 500 Kbps, L=160; for 250 Kbps, L=320, etc. The clock divider 49 may comprise a multiplier and a divider to implement (L/D*oscillator clock). The CAN controller 44 uses the CAN clock signal as a CAN protocol timing reference.

This internal calibration and node clock synchronization with the clock of the master node 12 allows the slave node 22 to generate an internal clock (CAN clock) and avoid the requirement for an external crystal, such that the slave node 22 can rely on the internal oscillator 46 for reliable, lossless communication over the CAN bus 14.

Figure 6:
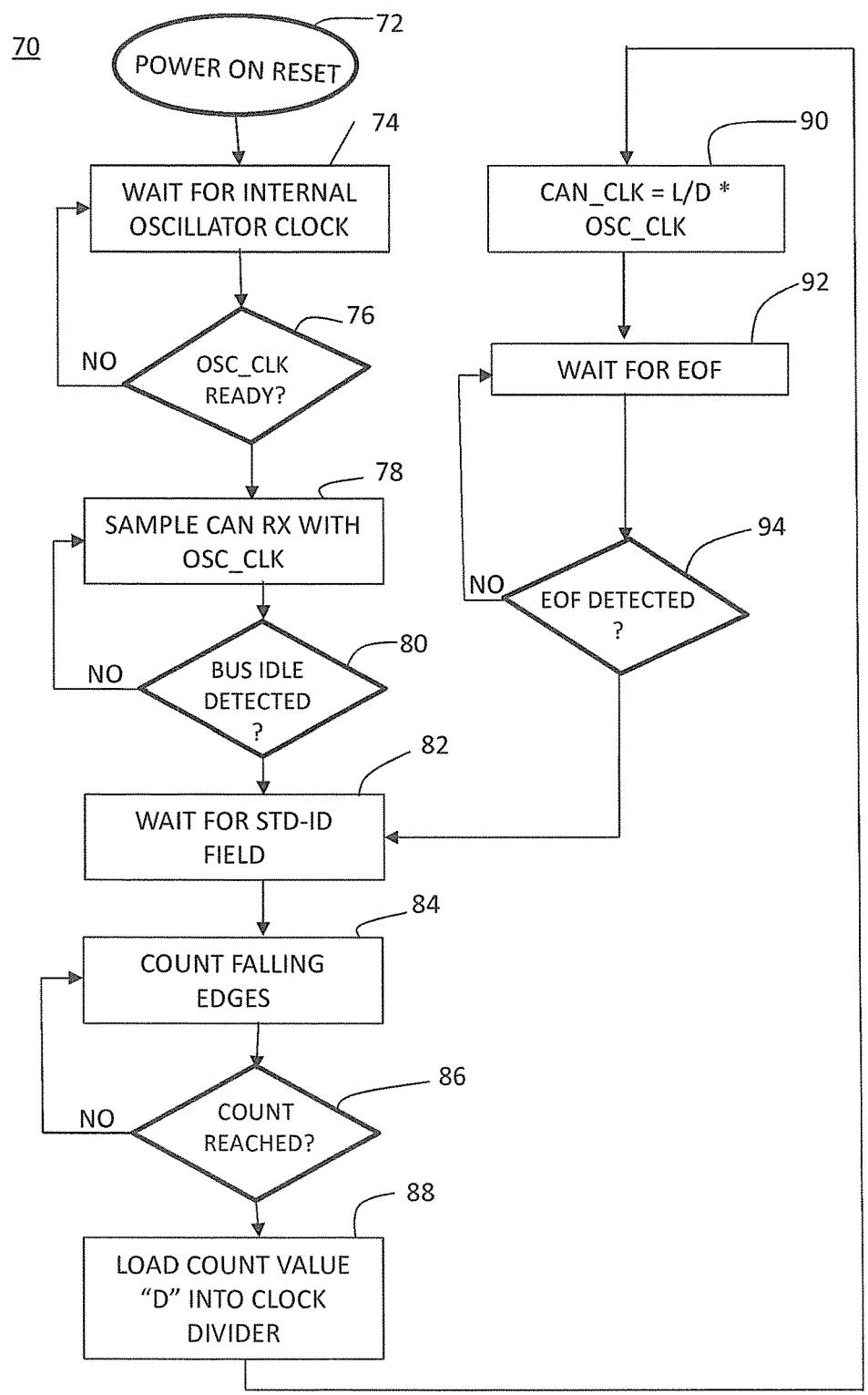
FIG. 6 is a flow chart illustrating a method of processing a frame by a slave node in accordance with an embodiment of the present invention.

Referring now to FIG. 6, a flow chart 70 illustrating operation of a slave node on a CAN bus in accordance with the preferred embodiment of the invention is shown. The flow chart 70 details how the data frame 50 shown in FIG. 5 is parsed by the slave nodes 22. Initial steps include power on reset 72, and then waiting for the internal oscillator to generate a clock signal (the internal oscillator clock) at step 74. Step 76 checks to determine when the internal oscillator clock is ready. Steps 74 and 76 are repeated until the internal oscillator clock is ready. Once the clock signal is ready, the data received on the CAN bus and provided on the CAN RX line is sampled (i.e., over-sampled). This CAN data also is provided to the CAN controller 44 and the pattern detector 48 by the CAN transceiver 42. Initially, the bus data is sampled using the oscillator clock signal. The pattern detector 48 checks for the minimum 11-bit idle sequence 54, and continues to check for the idle sequence 54 by repeating steps 78 and 80. This check is required to determine the SoF 56. Once the 11-bit idle is detected at step 80, at step 82, the second falling edge of the CAN RX line is detected. At step 84, the CAN RX line is monitored with the internal oscillator clock, detecting and counting the falling edges. Then, step 86 checks if the CAN RX line has reached the sixth falling edge (in the preferred embodiment, six (6) bits are used, but as previously noted with reference to FIGS. 4 and 5, more or fewer bits could be used).

At step 88, the load count value (divisor D) is provided to the fractional clock divider 49. That is, D is the count for the measure and calibrate 52 period (8 bits at a time). At step 90, the clock divider 49 generates the CAN clock signal as (L/D*osc_clk), where L is a constant, D is the count value, and osc_clk is the oscillator clock signal. In one embodiment, the constant L is 80. As noted above, the value of L is based on the baud rate used to generate a fixed 10 MHz CAN clock. For 1000 Kbps, L=80; for 500 Kbps, L=160; for 250 Kbps, L=320, etc. The calculated CAN clock signal then is provided to the CAN controller 44, which henceforth uses the CAN clock signal as the CAN protocol timing reference 42. The pattern detector 48 remains operating using the oscillator clock to detect patterns and generate the CAN clock on all incoming frames.

At step 92, the pattern detector 48, which continues to sample the data frame 50, checks for the EoF 68, and if the EoF is detected at step 94, then the whole sequence is repeated to detect the next CAN frame start of pattern 52 by looping back to step 82. Otherwise the method repeats steps 92 and 94 until the EoF 68 is detected.

As will now be apparent, the present invention provides a CAN bus system that allows slave nodes to be connected to the CAN bus by providing a slave node and a CAN frame with a fixed preamble. The present invention avoids the requirement for each node in a CAN bus system to have a precise clock source, which allows nodes to use more cost efficient, integrated clock sources with low demand on clock accuracy. The existing CAN protocol is used, unchanged, but in a way providing a fixed preamble. Thus, a CAN bus system according to the present invention can have a master-slave constellation.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. A Controller Area Network (CAN) bus system, comprising:
   a master node comprising a master controller unit and an external crystal oscillator, wherein the external crystal oscillator generates a clock signal used by the master controller unit to generate an internal, master node CAN clock signal;
   at least one slave node comprising a slave controller unit, wherein the slave node does not include and is not coupled to an external crystal oscillator, and wherein the slave controller unit generates, internally, a slave node CAN clock signal; and
   a CAN bus coupling the master node and the at least one slave node and enabling communications therebetween,
   wherein the at least one slave node monitors the CAN bus, analyzes frames transmitted over the CAN bus for a predetermined fixed pattern, and uses the predetermined fix pattern to generate the slave node CAN clock signal.

2. The CAN bus system of claim 1, wherein the slave node CAN clock signal permits the slave node to operate at a same effective baud rate as the master node.

3. The CAN bus system of claim 1, wherein the at least one slave node comprises a plurality of slave nodes coupled to the CAN bus, and wherein none of the slave nodes is coupled to an external crystal oscillator and each of the slave nodes analyzes frames transmitted over the CAN bus for a predetermined fixed pattern and uses the predetermined fix pattern to generate its own slave node CAN clock signal.

4. The CAN bus system of claim 3, further comprising one or more additional master nodes coupled to the CAN bus, wherein each of the additional master nodes includes an external crystal oscillator used to generate its own master node CAN bus clock signal.

5. A slave node for a Controller Area Network (CAN) bus system, the slave node comprising:
   a slave controller unit that processes data frames generated by a master node connected to a CAN bus, and generates its own data frames for transmission over the CAN bus, wherein the slave controller unit generates, internally, a CAN clock signal and operates in accordance with the CAN clock signal; and
   a CAN transceiver for connection to the CAN bus, and connected to the slave controller unit, wherein the CAN transceiver (i) receives the data frames transmitted over the CAN bus by the master node and provides said data frames to the slave controller unit, and (ii) provides the data frames generated by the slave controller unit to the CAN bus for transmission there-across,
   wherein the generated CAN clock signal permits the slave node to operate at a same effective baud rate as the master node, and
   wherein the slave node is not connected to an external crystal oscillator for generation of the CAN clock signal.

6. The slave node of claim 5, wherein the slave controller unit comprises:
   a CAN controller, connected to the CAN transceiver, that (i) processes the data frames received from the CAN transceiver, and (ii) generates its own data frames and provides said generated data frames to the CAN transceiver, wherein the CAN controller operates based on the CAN clock signal;
   an internal oscillator that generates an internal oscillator clock signal;
   a pattern detector connected to the CAN transceiver and the internal oscillator, wherein the pattern detector (i) receives the data frames from the CAN transceiver, (ii) scans the data bits thereof for a predetermined fixed pattern, and (iii) counts edges of the bits of the data defining the predetermined fixed pattern using the internal oscillator clock signal to generate a divisor D; and
   a fractional clock divider that receives the internal oscillator clock signal, the divisor D, and a constant L, and generates the CAN clock signal therefrom, wherein D and L are greater than 1.

7. The slave node of claim 6, wherein the divisor D is calibrated for every received data frame.

8. The slave node of claim 6, wherein the fractional clock divider generates the CAN clock signal as (L/D*the internal oscillator clock signal).

9. The slave node of claim 8, wherein the value of L is based on a baud rate used to generate the master node CAN clock signal.

10. The slave node of claim 9, wherein L equals 80.

11. The slave node of claim 6, wherein the predetermined fixed pattern is part of the Identifier (ID) field of a CAN data frame.

12. The slave node of claim 6, wherein the CAN transceiver converts the data of the data frames received from the CAN bus to levels suitable for use by the slave controller unit.

13. The slave node of claim 6, wherein the CAN transceiver converts the data frames generated by the slave controller unit to levels suitable for transmission over the CAN bus.

14. A method of operating a slave node connected to a Controller Area Network (CAN) bus, wherein one or more master nodes and one or more slave nodes are connected to the CAN bus, each master node has an external crystal oscillator for generating its CAN clock signal, and none of the slave nodes includes an external oscillator for generating their respective CAN clock signals, the method comprising:

receiving CAN data transmitted over the CAN bus;

sampling the received data, using an oscillator clock signal generated with an internal oscillator, for a predetermined fixed pattern;

upon detection of the predetermined fixed pattern, counting edges of the bits of the data defining the predetermined fixed pattern using the oscillator clock signal to determine a divisor D;

generating a local CAN clock signal using the divisor D, the oscillator clock signal, and a constant L, wherein D and L are greater than 1; and using the local CAN clock signal to process data frames, wherein the local CAN clock signal permits the slave node to operate at a same effective baud rate as the one or more master nodes.

15. The method of claim 14, wherein the divisor D is calibrated for every received data frame.

16. The method of claim 15, wherein the local CAN clock signal is calculated as (L/D*the oscillator clock signal).

17. The method of claim 16, wherein the value of L is based on a baud rate used to generate the CAN clock signals of the one or more master nodes.

18. The method of claim 16, wherein L equals 80.

19. The method of claim 14, wherein the predetermined fixed pattern is part of the Identifier (ID) field of a CAN data frame.

* * * * *